United States Patent
Lesage et al.

(10) Patent No.: US 10,724,745 B2
(45) Date of Patent: Jul. 28, 2020

(54) HEATING DEVICES TO PREVENT BACTERIA PROLIFERATION IN THE LOWERMOST REGION OF A WATER HOLDING TANK OF AN ELECTRIC WATER HEATER

(71) Applicant: MICLAU-S.R.I. INC., Montreal East (CA)

(72) Inventors: Claude Lesage, Pointe Claiare (CA); Jean-Claude Lesage, Kirkland (CA)

(73) Assignee: MICLAU-S.R.I. INC., Montreal East (CA)

( * ) Notice: Subject to any disclaimer, the term of this patent is extended or adjusted under 35 U.S.C. 154(b) by 356 days.

(21) Appl. No.: 15/731,956

(22) Filed: Sep. 1, 2017

(65) Prior Publication Data

US 2019/0072283 A1    Mar. 7, 2019

(51) Int. Cl.
| | |
|---|---|
| *A47J 31/54* | (2006.01) |
| *F24H 1/18* | (2006.01) |
| *F24D 17/00* | (2006.01) |
| *F24H 9/20* | (2006.01) |
| *F24H 1/20* | (2006.01) |

(52) U.S. Cl.
CPC ..... *F24D 17/0073* (2013.01); *F24D 17/0031* (2013.01); *F24H 1/182* (2013.01); *F24H 1/185* (2013.01); *F24H 1/202* (2013.01); *F24H 9/2021* (2013.01); *F24D 2200/08* (2013.01)

(58) Field of Classification Search
CPC ............. F24D 17/0031; F24D 17/0073; F24D 2200/08; F24H 1/182; F24H 1/185; F24H 1/202; F24H 9/2021

USPC ................................ 392/441–444, 449–462
See application file for complete search history.

(56) References Cited

U.S. PATENT DOCUMENTS

| | | | | |
|---|---|---|---|---|
| 5,168,546 A | * | 12/1992 | Laperriere | .......... F24D 17/0073 122/14.22 |
| 5,178,351 A | * | 1/1993 | Lesage | .................... A47J 36/34 220/636 |
| 5,180,077 A | * | 1/1993 | Lewis | ..................... F24H 1/182 220/567.3 |
| 6,242,720 B1 | * | 6/2001 | Wilson | .................. F24H 9/2021 219/486 |
| 2013/0202277 A1 | * | 8/2013 | Roetker | ................. F24H 1/202 392/441 |

(Continued)

*Primary Examiner* — Sang Y Paik
(74) *Attorney, Agent, or Firm* — Guy J. Houle; Houle Patent Agency Inc.

(57) ABSTRACT

An electric water heater is described and wherein the bottom portion of the water holding tank is provided with various forms of electric heating elements to heat the water in the lowermost region of the tank adjacent the dome-shaped bottom wall to a temperature sufficient to prevent the proliferation of bacteria growth such as the Legionella bacteria in such lowermost region. The insulating foam support base of the water heater also provides a thermal barrier to the heating elements while biasing the heating element on the dome-shaped bottom wall in a region to insure excellent heat transfer to the cavitated zone surrounding the dome-shaped bottom wall where sedimentary deposits occur to create a culture medium for bacteria growth. In one embodiment a heating wire transfers heat to the lowermost region from the lower end of the surrounding side wall of the tank and access to the heating wire is provided for connection and removal thereof.

6 Claims, 6 Drawing Sheets

(56) References Cited

U.S. PATENT DOCUMENTS

2016/0138830 A1\* 5/2016 Lesage ............... G05D 23/1934
219/486

\* cited by examiner

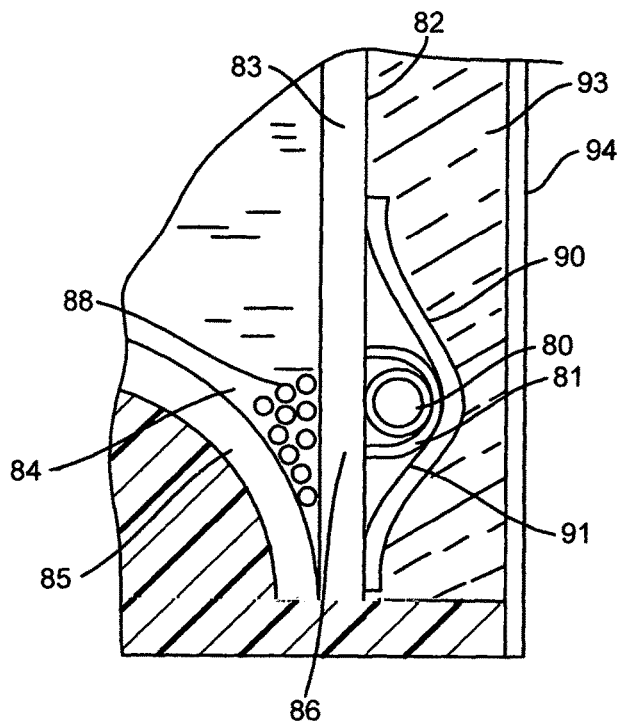
FIG. 11
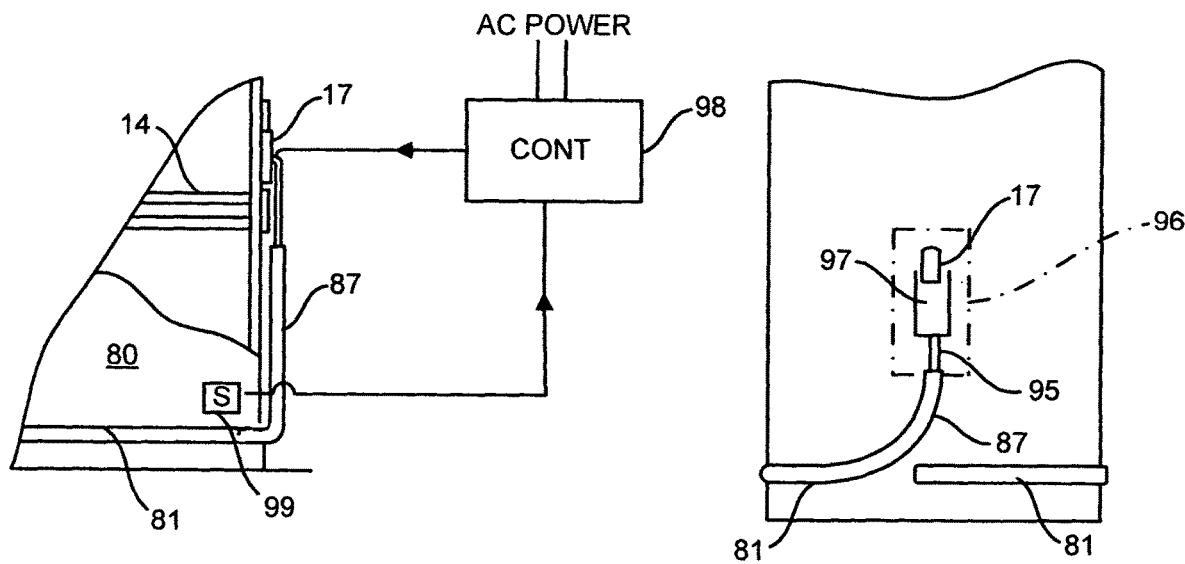
FIG. 12
FIG. 13

HEATING DEVICES TO PREVENT BACTERIA PROLIFERATION IN THE LOWERMOST REGION OF A WATER HOLDING TANK OF AN ELECTRIC WATER HEATER

FIELD OF THE INVENTION

The present invention relates to electric water heaters and particularly to the prevention of bacteria proliferation in the lowermost region of the water holding tank of the water heater where water temperatures are at their lowest and wherein a cavitated area is formed about the dome-shaped bottom wall that creates a zone for the accumulation of sedimentary deposits which can develop into a culture medium for bacteria growth.

BACKGROUND OF THE INVENTION

Although some species of Legionella bacteria can be found in the soil, most species live in water that is stagnant and wherein such bacteria survive under a wide range of temperatures. According to the Centers for Disease Control and Prevention, USA, between 8,000 and 18,000 people are hospitalized with Legionnaires disease each year. It is of great public concern as its fatality rate during an outbreak ranges from 5% to 30% in those who contract the disease. Actively managing the risk of Legionella in water systems is more cost effective than responding to an outbreak. Outbreaks of Legionella pneumophila can stem from showers and potable water systems. As water from such sources aerosolized, individuals can inhale the Legionella containing droplets and the organism is aspirated into the lungs.

The formation and multiplication of such Legionella bacteria is not only promoted by the temperature in the customary hot water systems, but also by the fact that dead spaces are present in such water distribution systems in which deposits and sediment formation can arise, and typically in the bottom zone of water heater tanks. Deposits therein can represent a culture medium for bacteria proliferation.

Most electric water heaters for domestic use have their water tank constructed with a dome shaped bottom wall. Such dome-shaped bottom walls form a surrounding cavitated zone about the dome-shaped wall where sediments deposit can gather and where water is less agitated. This cavitated zone is spaced from the bottom heating element and thus water therein is less hot which can create an ideal location for bacterial growth. Should the bottom element fail, then the water temperature at the bottom of the tank will drop. It as also been determined by research that the Legionella bacteria does not survive at temperatures above 140 degrees F. When hot water is not drawn from a water heater, the water inside the tank becomes stagnant and the water temperature stratifies with the cooler temperature being at the bottom region of the tank. Water within the cavitated zone below the bottom element of the tank can fall to about 85 to 105 degrees F. which is favorable to bacteria growth. It is said to be difficult to increase the temperature at the bottom of the tank when there is not water consumption. The solution to the problem is to raise the temperature in the bottom end of the tank. However, lowering the bottom element to place it close to the bottom wall of the tank has not proven to be a viable solution.

Reference is made to U.S. Pat. Nos. 4,940,024; 5,168,546 and 5,808,277 which disclose various methods and apparatus to prevent bacteria proliferation in electric water heaters. One method teaches adding a heating element in the form of a belt or patch on the outside of the tank against the bottom end of the outer sidewall of the tank to heat the water at the bottom end of the tank to a temperature preferably above 55 degrees C. (130 degrees F.). Accordingly, this proposed solution provides an extra heating element in the form of one or more electrical patch heaters located in an area which is usually filled with insulating foam material and not practical to access should it fail and require replacement or repair. Providing a large access panel for access to such elements is not practical as the expandable foam would cover the elements and if a large foam dam is used then there will be considerable heat loss in that region. It is not a practical solution and it is also costly and consumes more electricity. In U.S. Pat. No. 5,808,277 a third element is added into the tank to periodically raise the water temperature at the bottom of the tank beyond the pre-set consumption temperature, to a sanitizing temperature to destroy bacteria. This is also a costly proposition. U.S. Pat. No. 4,940,024 discloses a method of directing the cold water flow of all consumed drinking or domestically used water through the lower region of the tank wherein there is no stagnant water and wherein no deposits can be formed for bacteria growth. Accordingly, the lower region of the tank is continuously flushed with fresh water. This is a costly solution requiring a new tank design and cold water conduit network and therefore not a viable solution.

SUMMARY OF THE INVENTION

It is a feature of the present invention to provide an electric water heater with controllable heating devices secured in the lower region of the tank in the area of the dome-shaped bottom wall to maintain the temperature of water in the immediate area of the dome-shaped bottom wall at a temperature range wherein harmful bacteria such as the Legionella bacteria will not survive.

Another feature of the present invention is to incorporate a resistive heating element in the form of a heating film or a heating wire or a shaped rigid resistive heating element in a cavitated formation formed in a top surface of a dome portion of a rigid foam insulating support base to position the heating element in direct contact against the dome-shaped bottom wall of the tank to heat the bottom wall and the water there against at a temperature sufficient to prevent harmful bacteria growth in the lowermost region of the water holding tank.

Another feature of the present invention is to provide automatic control of the heating elements mentioned in the previous paragraph to independently heat the water in the lowermost region of the tank and wherein the automatic control may be a remote controller or a thermostat located in a cavity of the insulating support base and having a temperature sensor thereof biased against the tank bottom wall.

A still further feature of the present invention is to provide a conduit of thermally conductive material secured about a substantial lowermost portion of the side wall of the water holding tank of an electric water heater and wherein a heating wire of predetermined power density is removably retained in the conduit.

Another feature of the present invention is to provide an electric heating element in contact with the lower region of the water holding tank against the dome-shaped bottom wall of the tank or the surrounding side wall of the tank in the region of the bottom wall and wherein the electric heating element is in thermal contact with the tank and insulated from the outside by thermally insulating foam material with the heating element operated for a predetermined time periods sufficient to raise the temperature of water in the lowermost portion of the tank to a temperature wherein harmful bacteria cannot survive.

A still further feature of the present invention is to support a resistive heating element in the cavitated circumferential area defined between a lower end portion of the tank side wall and the dome-shaped bottom wall to heat water in the immediate area of the dome-shaped bottom wall to a temperature sufficient to sanitize the tank in its lowermost region to prevent bacteria growth in the cavitated area.

According to the above features, from a broad aspect, the present invention provides an electric water heater which is comprised of a water holding tank having a cylindrical side wall, a top wall and a dome-shaped bottom wall. A cold water inlet is disposed for releasing water under pressure in a lower portion of the tank. Two or more resistive heating elements heat water in an upper and a lower region of the tank. A thermostat, having a temperature sensor and a control, is associated with each of the two or more resistive heating elements to control the operation of the resistive heating elements to heat water within the tank regions to pre-set desired temperatures. An insulating support base is fitted at a bottom end of the water holding tank and shaped and disposed for contact with an outer surface of the dome-shaped bottom wall. A controllable electric heating means is interposed between the insulating support base and the outer surface of the dome-shaped bottom wall to heat water in the tank in the immediate area of the dome-shaped bottom wall to a temperature sufficient to sanitize the tank lower region.

According to another broad aspect of the present invention a spiral cavity is formed in an outer face of the surrounding lower portion of the insulating support base and shaped for housing a heating wire constituting a controllable heating means. The spiral cavity positions the heating wire in flush contact with the dome-shaped bottom wall adjacent an inner cavitated circumferential area of the dome-shaped bottom wall of the tank. A control means is provided for controlling the power supply to the heating wire.

According to another broad aspect of the invention a circular cavity is formed about the outer face of the surrounding lower portion of the dome portion of the insulating support base and shaped for housing a rigid circular shaped resistive heating element in close fit therein. The circular resistive heating element has a space defined between opposed adjacent connector ends thereof for securing conductors to a power supply to energize the circular resistive heating element.

According to a still further broad aspect of the invention there is provided an electric water heater comprised of a water holding tank having a cylindrical side wall, a top wall and a dome-shaped bottom wall. A cold water inlet is disposed for releasing water under pressure in a lower portion of the tank. Two or more resistive heating elements are provided to heat water in an upper and lower region of the tank. A thermostat, having a temperature sensor and a control, is associated with each of the two or more resistive heating elements to control the operation of the resistive heating elements to heat water within the tank regions to pre-set desired temperatures. A conduit of thermally conductive material is secured about at least a substantial circumferential portion of an outer surface of the cylindrical side wall adjacent the dome-shaped bottom wall. A resistive heating wire is disposed in the conduit and has connection leads extending out of a free open end of the conduit to an access area to provide connection to power terminals and control means. The control means controls the supply of power to the resistive heating wire.

According to another broad aspect of the present invention there is provided an electric water heater having a bacteria preventive feature to prevent bacteria growth in the cavitated area at the bottom of the tank.

DESCRIPTION OF THE DRAWINGS

A preferred embodiment of the present invention will now be described with reference to the examples thereof as illustrated by the accompanying drawings in which:

FIG. 11 is a fragmented sectional view of an example of a heating element secured about the outer surface of the water holding tank side wall in the area adjacent the dome-shaped bottom wall of the tank and wherein a heating wire is removably positioned within a thermally conductive conduit secured to the tank side wall;

FIG. 12 is a fragmented side view illustrating an embodiment for the control of the heating element of FIG. 11;

FIG. 13 is a simplified side view showing the shape of an end section of the conduit to provide access thereto for the insertion and removal of the heating wire;

DESCRIPTION OF THE PREFERRED EMBODIMENT OF THE INVENTION

Figure 1:
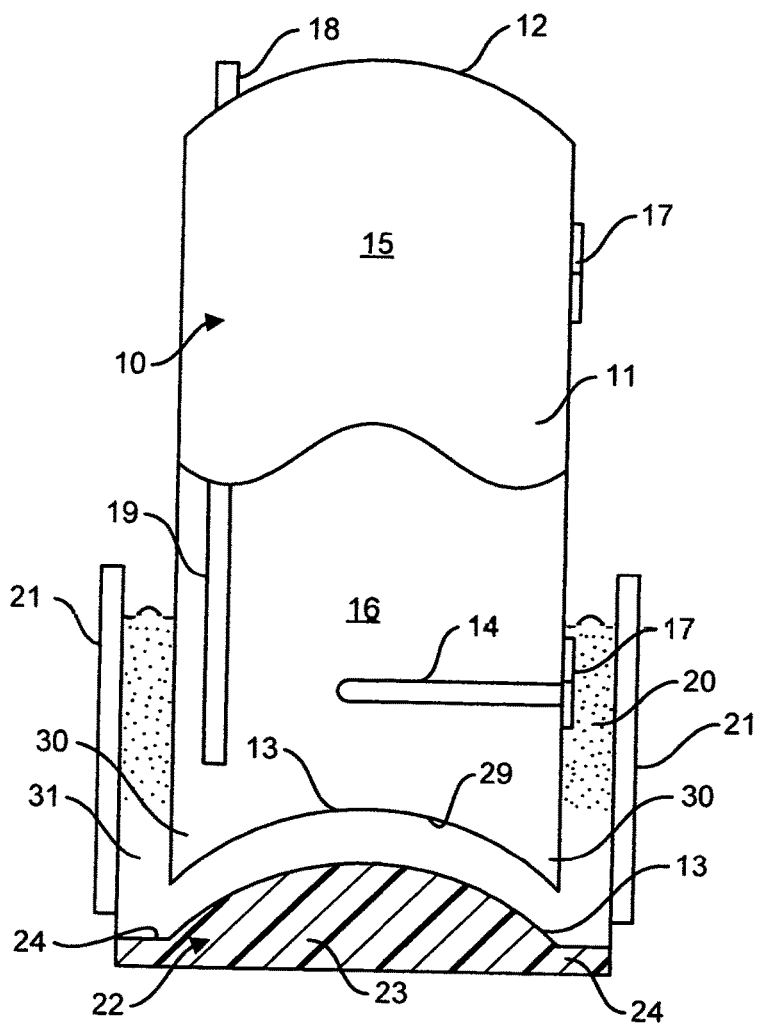
FIG. 1 is a simplified schematic illustration, partly fragmented and exploded, showing a water holding tank of an electric water heater of the prior art supported on an insulating support base.

Referring now to the drawings and more particularly to FIG. 1, there is shown a schematic illustration of a water holding tank 10 of an electric water heater and sized to contain a predetermined volume of water to be heated. The water holding tank 10 is constructed of steel material and defines a circumferential side wall 11, a top wall 12 and a dome-shaped bottom wall 13. Two or more resistive heating elements, herein the bottom resistive heating element 14 being shown, extend with the water holding tank to heat water in the upper region 15 and bottom region 16 of the tank. Each of the resistive heating elements have a thermostat 17 associated therewith and provided with a temperature sensor and control, not shown but obvious to a person skilled in the art, for the operation of the resistive heating elements 14 to heat water within their respective regions of the tank to preset temperatures set within the control of the thermostat, usually at 140 degrees F. When water is drawn from the top end of the tank through a hot water supply conduit 18, cold water from the domestic water supply is introduced in the bottom region 16 of the tank via a dip tube 19. The water holding tank 10 is insulated by expandable foam material 20 injected between the tank 10 and an outer shell 21 of the water heater. As illustrated, the water holding tank 10 is supported on an insulating rigid foam support base 22 which is shaped for contact with the dome-shaped bottom wall 13 of the tank to thermally insulate and provide support to the dome-shaped bottom wall of the tank. The support base 22 has a dome support portion 23 and a circumferential outer support flange portion 24 on which the lower edge of the tank side wall is also supported. The flange portion 24 extends for close fit with the inner surface of the outer shell 21 onto which the foam 20 expands to. Thus, is a brief description of a prior art water holding tank 10 and insulation of the tank of an electric water heater.

Figure 2:
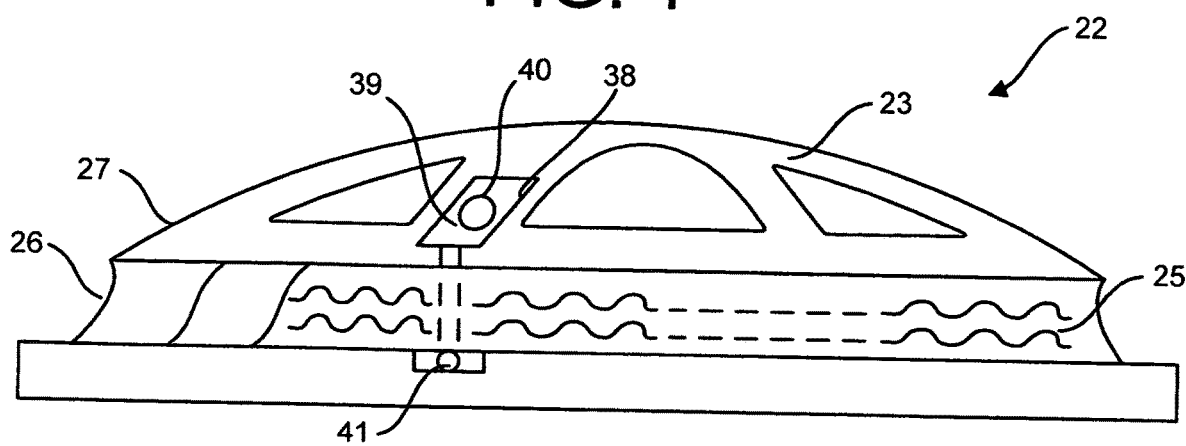
FIG. 2 is a side view of a dome shaped support base modified in accordance with the present invention to support and position a film-type heating element therein and a thermostat for the control of the heating element.
Figures 3, 4:
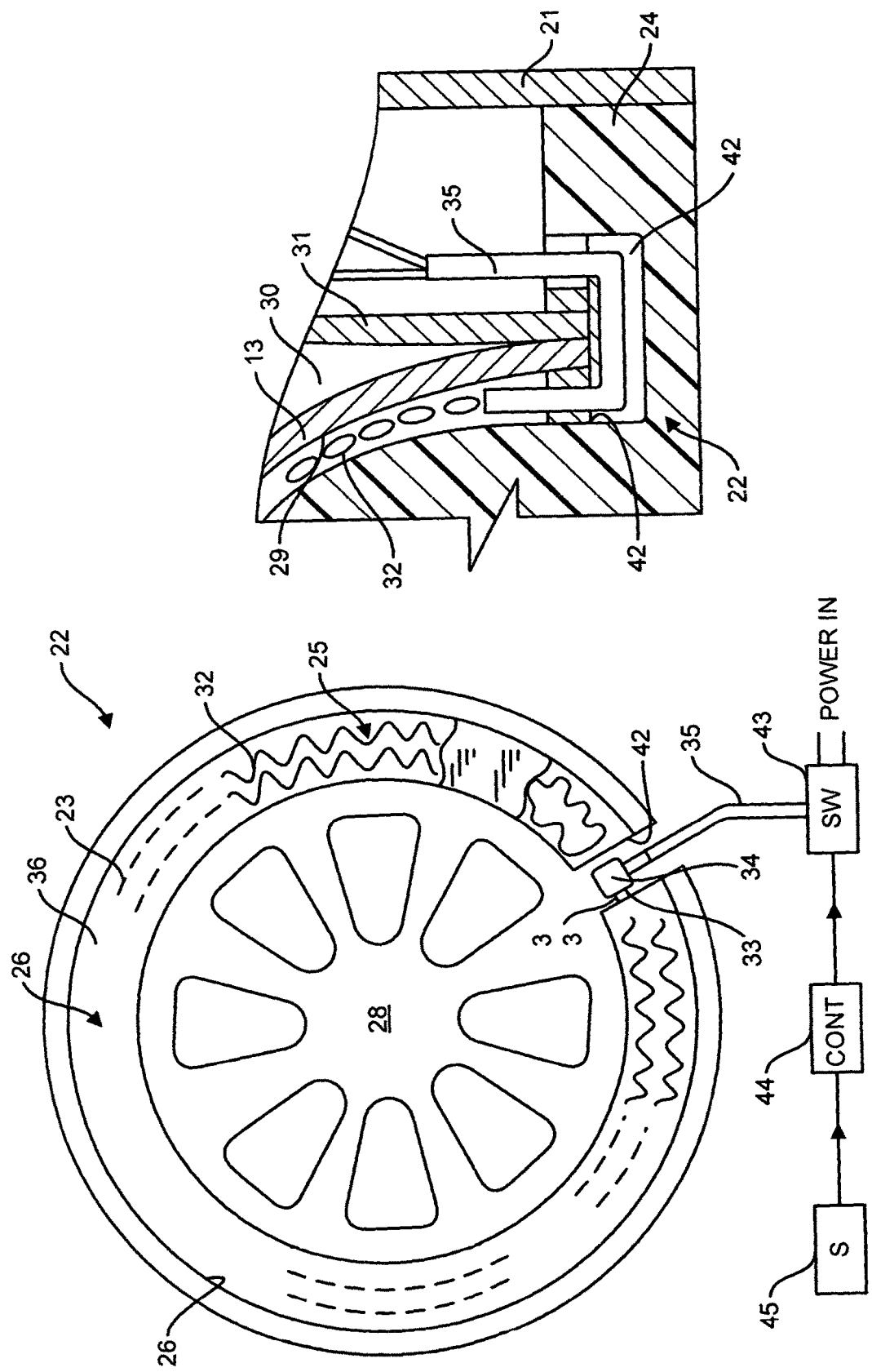
FIG. 3 is a top view of the dome shaped support base of FIG. 2 but modified wherein the control is an automatic control device located externally of the support base.
FIG. 4 is an enlarged view illustrating a cavity passage formed in the insulating support base for the passage of wires under the surrounding bottom edge of the water holding tank.

With reference now to FIGS. 2 to 4 there is shown an example of a heating means associated with insulating support base 22 for heating the dome-shaped bottom wall 13 of the water holding tank 10. As herein illustrated the heating means is in the form of a resistive film-type electric heating element 25 which is fitted and glued within a shallow, belt-shaped, surrounding cavity 26 formed in an outer face 27 of a surrounding lower portion of the dome portion 23 of the insulating support base. The cavity 26 has a depth wherein when the tank 10 is positioned over the insulating support base 22, the film-type resistive heating element 25 is in direct contact with the outer surface 29 of the dome-shaped bottom wall 13 to provide direct heat transfer to the bottom wall 13. As herein shown, the cavity 26 is disposed in a lower area of the dome portion 23 of the support base whereby to heat the dome-shaped bottom wall 13 of the tank in a cavitated circumferential area 30 defined between a lower end portion 31 of the tank 10 circumferential side wall 11 and the dome-shaped bottom wall 13.

As shown in FIGS. 2 and 3, the thin film-type heating element has one or more resistive heating wires 32, herein one sinusoidal shaped wire, and connection leads 33 secured to a connection terminal 34 to which power supply leads 35 are connected to. The connection terminal 34 is also located in an appropriate cavity formed in the support base. The cavity 26 is formed with a flat bottom wall 36 shaped to extend parallel to the dome-shape bottom wall 13. As shown in FIG. 3, a reflective substrate 37 may be glued on the flat bottom wall 36 of the cavity or may be laminated to the film-type heating element 25 whereby to reflect heat in the direction of the dome-shaped bottom wall. Of course, the insulating support base is molded from a suitable styrene foam material capable of resisting to the heat generated by the heating element 25.

Figure 5:
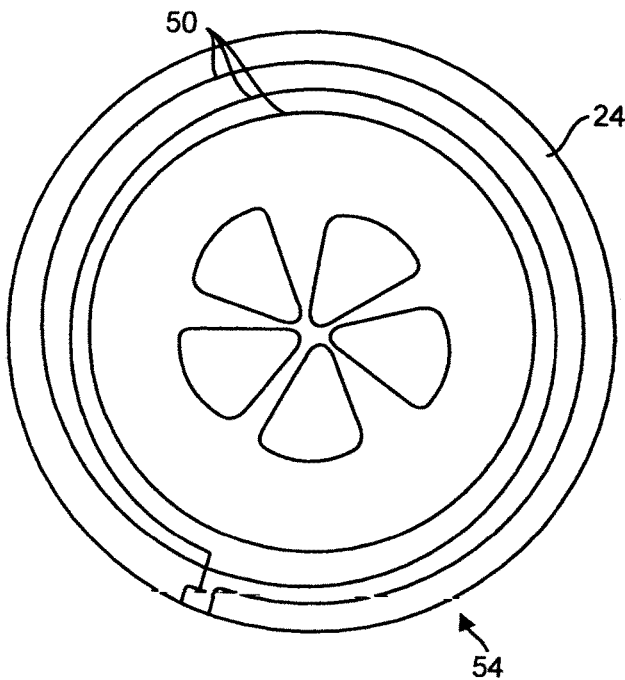
FIG. 5 is a top view of the insulating support base wherein a spiral channel is formed in the top surface of the support base for housing a heating wire in spiral form therein.
Figure 6:
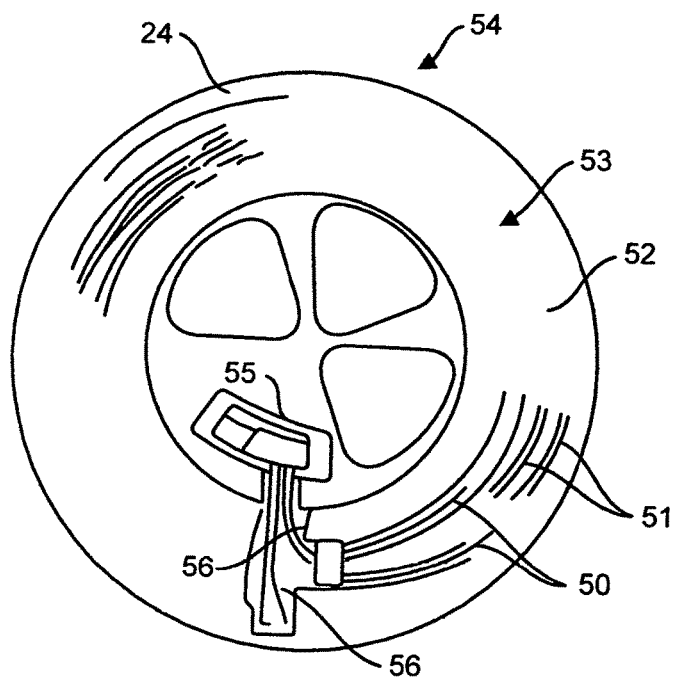
FIG. 6 is a top view, similar to FIG. 5, but wherein the insulating support base has been modified to support a thermostat and associated wiring and connections.
Figure 7:
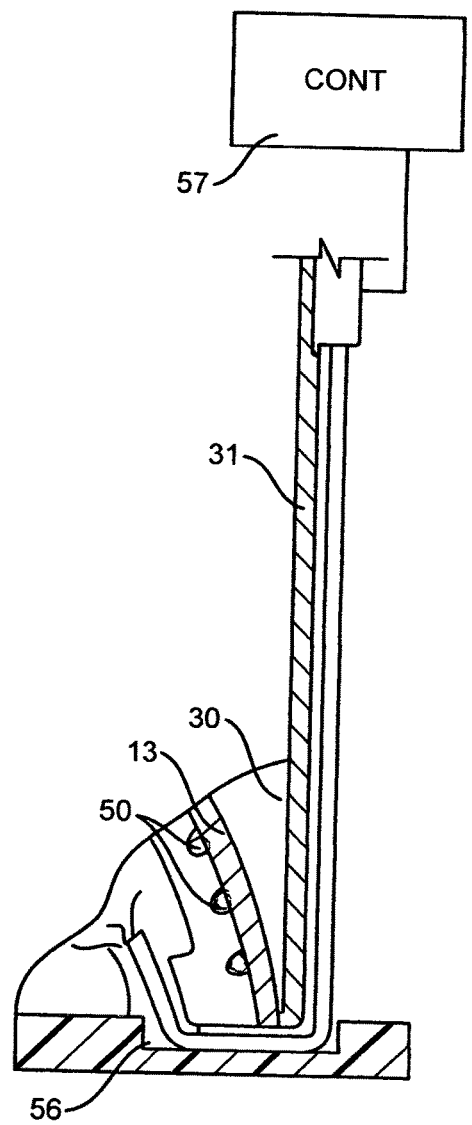
FIG. 7 is a fragmented side view of the insulating support base of FIG. 6 illustrating the cavities and channels formed therein for the passage of wiring to connect to an external controller.

As shown in FIG. 2 a thermostat locating cavity 38 is formed in the dome section 28 of the support base 22 to position a control thermostat 39 therein for close fit of its sensor 40 against the outer surface 29 of the dome-shaped bottom wall 13 to sense the temperature of the bottom wall 13 which is substantially the same as the water inside the tank against the bottom wall. A power supply cable 41 extends in a protective channel 42 and connects power to the thermostat 39 which controls the film-type heating element 25 to maintain the water temperature inside the tank in the region of the bottom wall 13 at a set desired temperature sufficient to prevent harmful bacteria proliferation, for example 140 degrees F. FIG. 3 shows another control for the resistive heating film 25 wherein the cable leads 35 connect externally to a switch 43 which is operated by a controller device 44 which receives temperature value signals from a sensor 45 secured to the tank outer surface adjacent the cavitated area 30. The controller is programmed to maintain the predetermined temperature in the tank lower portion adjacent the dome-shaped bottom wall. Other functions can be programmed within the memory of the controller to interface with a remote location such as the grid provider. A timer circuit may be associated with the controller if programmed to operate the heating element during predetermined time periods and predetermined programmed occurrences of the electric water heater Referring now to FIGS. 5 to 7, there is illustrated another embodiment of the invention wherein the heating element is in the form of a spiral heating wire 50 which is held in tight fit or glued into a spiral channel 51 formed in the outer surface 52 of the dome portion 53 of the insulating support base 54, which is similar to the insulating support base 22 of FIG. 2. Also, a thermostat locating cavity 55 may be formed to house a thermostat 56 therein. However, if the water heater is equipped with an intelligent controller, by noticing a temperature increase from 140 degrees F. to 141, it will provide an indication that the sanitation cycle is done. Channels 56 are also formed to accommodate the wiring and connectors as with the FIG. 2 embodiment. The operation of the spiral wire heating wire can also be controlled by a remote controller 57 operating the same as the controller 44 of FIG. 3.

Figure 8:
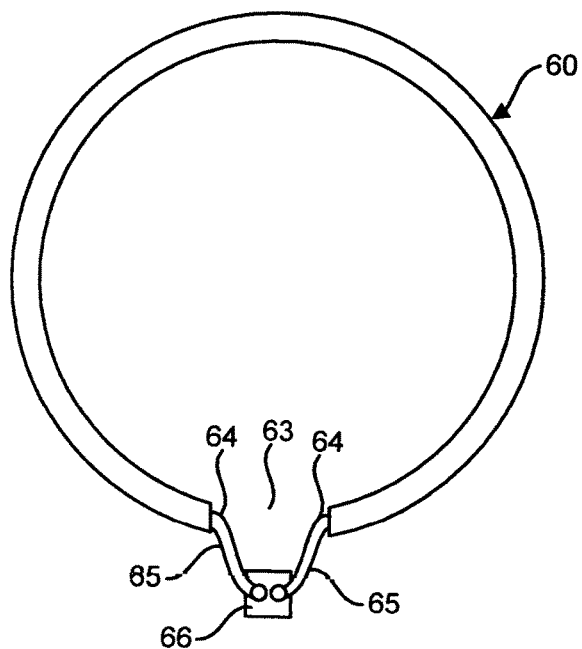
FIG. 8 is a top view of a circular resistive heating element shaped for attachment in an insulating support base of an electric water heater.
Figure 9:
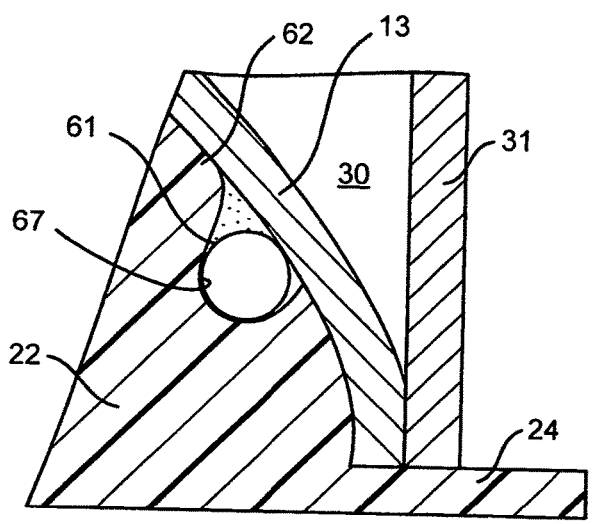
FIG. 9 is a fragmented sectional view of a bottom outer region of a water holding tank resting on an insulating support base in which the circular resistive heating element of FIG. 8 is secured in close snap-fit in a circular cavity formed in the outer surface of the dome bottom portion of the support base to position the resistive heating element in contact with the dome-shaped bottom wall of the tank and wherein a heat conductive paste is positioned in the voids about the resistive heating element.
Figure 10:
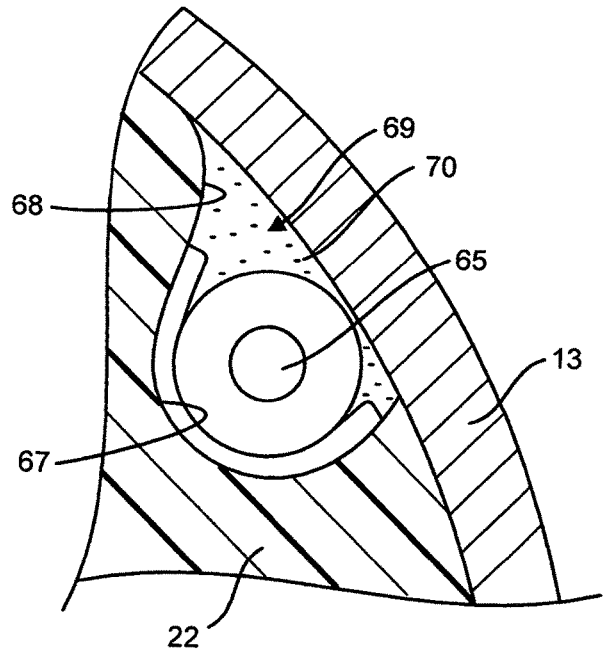
FIG. 10 is an enlarged view of the region of the resistive heating element shown in FIG. 9 located in its retention cavity.

With reference now to FIGS. 8 to 10, there is illustrated an another version of the invention wherein the heating element is a resistive heating element commonly found in water heaters but wherein the element is formed as a circular resistive heating element 60 which is retained in close snap-fit engagement in a circular cavity 61 formed about the outer face 62 of the surrounding lower portion 63 (see FIG. 1) of the dome portion 23 insulating support base 22. The circular resistive heating element 60 has a space 63 defined between opposed conductor ends 64 thereof for the leads 65 to secure to a connector 66 to which power can be connected in a similar fashion as with the previous embodiments described above.

As better seen in FIG. 10, the circular cavity 61 has an arcuate bottom wall 67 and an upwardly curved upper side wall 68 shaped to provide easy snap-fit entry of the circular resistive heating element 60 therein from above the base. A heat conductive paste 69 of a type well known in the art and suitable for this application, is applied over the resistive heating element and surrounding open top end areas 70 to fill the voids and provide good heat transfer to the dome-shaped bottom wall of the tank. Alternatively, or in combination therewith, a heat reflective substrate or film 71 may be glued within the circular cavity 61. The connections and operation of the circular resistive heating element is the same as with the other resistive heating elements described above.

Referring now to FIGS. 11 to 13 there is illustrated a different embodiment wherein a heating wire 80 is removably retained inside a conduit 81 formed by a U-shaped non-conductive material, such as plastic or other suitable material, and which is secured about at least a substantial circumferential portion of the outer surface 82 of the cylindrical side wall 83 of the water holding tank of an electric water heater. The conduit 81 extends in a lower region of the tank adjacent the dome-shaped bottom wall 85 adjacent the circumferential cavitated zone 84 defined between the bottom end section 86 of the tank side wall 83 and the dome-shaped bottom wall where sediments 88 collect to create a culture zone for bacteria growth. The U-shaped conduit 81 may be made of flexible material capable of being curved over the curved side wall 83 or be pre-formed as a curved conduit.

As shown in FIG. 11 the conduit 81 may be immovably retained against the side wall 83 by a suitable adhesive tape 90, or tape portions. The tape and the conduit is also held immovable by the expandable insulating foam 93 injected in the space between the tank outer wall and the outer shell 94. A reflective tape (not shown) can also be held against the conduit 80 to reflect heat towards the tank side wall 83.

As shown in FIGS. 12 and 13, the conduit 81 has an upwardly curved end section 87 with a free open top end 95 which terminates in the access opening 96 of the bottom resistive heating element 14, see FIG. 1. The heating wire 80 is inserted into the conduit 81 through this open top end 95 and is connected to power terminals of the terminal block 97 of the lower thermostat 17 through which power is rendered accessible by suitable controls such as the controller 98 illustrated in FIG. 12 through which power is provided when necessary to do so as determined by monitored signals received from water temperature sensor 99. Therefore, access is provided to the heating wire 80 for replacement if necessary and connection to a supply without having to form another access opening between the tank and the outer shell and providing an additional access panel.

Figure 14:
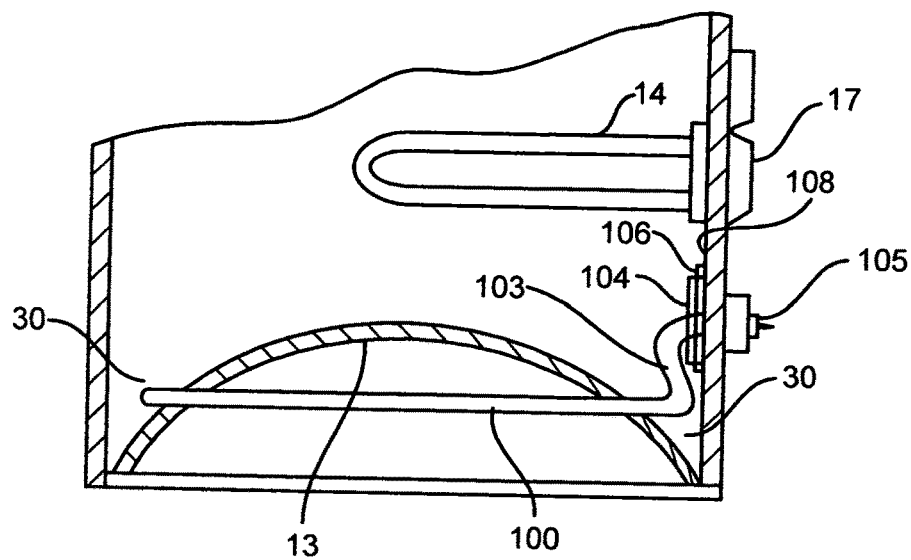
FIG. 14 is a fragmented sectional view illustrating a still further embodiment of the present invention wherein a resistive heating element is supported inside the tank and in the cavitated circumferential area defined between a lower end portion of the side wall of the tank and the dome-shaped bottom wall.
Figure 15:
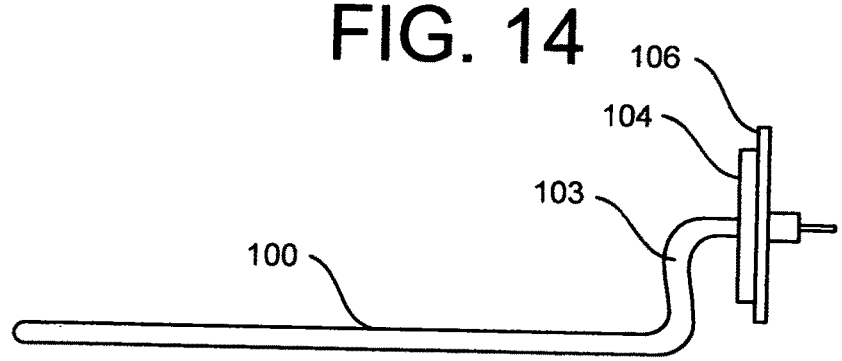
FIG. 15 is a side view illustrating the shape and construction of the resistive heating element of FIG. 14.
Figure 16:
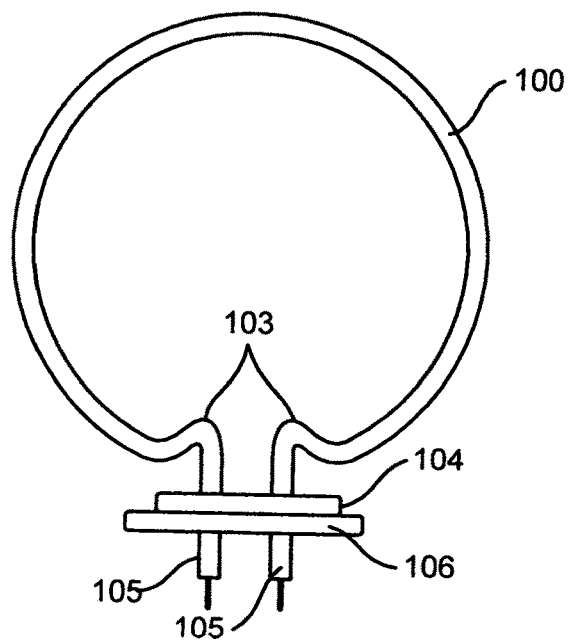
FIG. 16 is a top view of FIG. 15.

Referring now to FIGS. 14 to 16 there is shown a still further embodiment of the present invention wherein a bottom resistive heating element 100 is shaped to extend at least partly within the cavitated circumferential area 30 defined between the tank side wall 11 and the dome-shaped bottom wall 13. As better illustrated by FIGS. 15 and 16, the bottom resistive heating element 100 has a circular shape 101 with spaced opposed free end sections 102 each shaped as an upwardly extending goose-neck 103 to which is secured a connecting flange 104 spaced form the free ends 105. The free ends 105 extend through a securement hole in the tank side wall with a water-proof gasket 106 disposed against the flange 104 and an inner face 108 of the side wall 11. An outer connecting flange assembly 107 holds the connecting flange in pressure engagement with the inner surface 108 of the side wall to position the bottom resistive heating element 100 is a substantially horizontal plane in the cavitated circumferential area 30 and closely spaced to the inner face 108 of the side wall. The bottom element is a low watt density heating element and preferably secured to the tank wall by a dielectric connector assembly 107 formed of material made of copper or stainless, incoloy, inconel, or any other suitable material to prevent corrosion. The bottom resistive heating element 100 is installed before the dome-shaped bottom wall and must be positioned as low as possible but high enough to prevent interference during the assembly process of the dome-shaped bottom wall 13 with the tank side wall 11.

In all embodiments described herein the heating means is arranged such as to heat the water within the lowermost portion of the tank including the cavitated circumferential area to a temperature of 140 degrees F. and for a sufficient time to kill the Legionella bacteria. These heating means may also be operated during non-peak hours when electricity is plentiful and costs are lower It is within the ambit of the present invention to cover any modifications of the preferred embodiments described herein provided such modifications fall within the scope of the appended claims.

The invention claimed is:

1. An electric water heater comprising a water holding tank having a cylindrical side wall, a top wall and a dome-shaped bottom wall; a cold water inlet disposed for releasing water under pressure in a lower portion of said tank, two or more resistive heating elements to heat water in an upper and lower region of said tank, a thermostat having a temperature sensor and a control associated with each said two or more resistive heating elements to control the operation of said resistive heating elements to heat water within said tank regions to pre-set desired temperatures, an insulating support base at a bottom end of said water holding tank and having a solid dome-shaped portion disposed for contact with an outer surface of said dome-shaped bottom wall; and a controllable electrically conductive heating element disposed in a cavitated circumferential area of an outer surface of said dome-shaped portion of said insulating support base and in contact with said dome-shape bottom wall adjacent said cavitated circumferential area to heat water in said tank in the immediate area of said dome-shaped bottom wall to a temperature sufficient to sanitize said tank lower region to prevent the proliferation of harmful bacteria, and a control device for controlling the operation of said controllable electrically conductive heating element.

2. The electric water heater as claimed in claim 1 wherein said insulating support base is molded from a thermally insulating material and defines a circumferential outer support flange portion on which a lower edge of said tank side wall is supported and wherein said solid dome-shaped portion of said insulating support base is in flush support engagement, in at least portions thereof, with said outer surface of said dome-shaped bottom wall.

3. The electric water heater as claimed in claim 1 wherein said controllable electrically conductive heating element is a heating element film having one or more resistive heating wires and connection leads, said cavity having a protective channel formed therein for said connection leads to exit said insulating support base and connect to said control device.

4. The electric water heater as claimed in claim 1 wherein said cavity has a flat bottom wall shaped to extend parallel to said dome shape bottom wall in said surrounding lower portion of said support base and a depth wherein said heating element film is press-fit against said dome-shaped bottom wall by said insulating support base.

5. The electric water heater as claimed in claim 4 wherein a reflective substrate is positioned over said flat bottom wall of said cavity for reflecting heat from said film type heating element against said surrounding lower portion of said dome-shaped bottom wall.

6. The electric water heater as claimed in claim 1 wherein said control device is one of a thermostat secured to an outer surface of said water holding tank adjacent said dome-shaped bottom wall and a controller associated with a temperature sensor and/or a timer and/or a controller programmed to manage the operation of said electrically conductive heating element.

* * * * *